US012794060B2

(12) United States Patent
Nakamura

(10) Patent No.: US 12,794,060 B2
(45) Date of Patent: Nov. 10, 2026

(54) BATTERY PACK

(71) Applicant: MURATA MANUFACTURING CO., LTD., Kyoto (JP)

(72) Inventor: Tsuyoshi Nakamura, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 386 days.

(21) Appl. No.: 18/733,354

(22) Filed: Jun. 4, 2024

(65) Prior Publication Data

US 2024/0429515 A1 Dec. 26, 2024

(30) Foreign Application Priority Data

Jun. 26, 2023 (JP) ................................ 2023-104083

(51) Int. Cl.
*H01M 50/24* (2021.01)
*F16J 15/06* (2006.01)
*H01M 50/271* (2021.01)

(52) U.S. Cl.
CPC ............ *H01M 50/24* (2021.01); *F16J 15/06* (2013.01); *H01M 50/271* (2021.01)

(58) Field of Classification Search
CPC ............... H01M 50/24; H01M 50/271; H01M 2220/20; F16J 15/06; Y02E 60/10
See application file for complete search history.

(56) References Cited

U.S. PATENT DOCUMENTS

2012/0114998 A1* 5/2012 Hwang ............... H01M 50/213 429/99
2022/0336898 A1* 10/2022 Kim .................... H01M 50/105

FOREIGN PATENT DOCUMENTS

CN 214589063 * 11/2021
JP 2004144384 A 5/2004

* cited by examiner

*Primary Examiner* — Lisa S Park
(74) *Attorney, Agent, or Firm* — K&L Gates LLP

(57) ABSTRACT

A battery pack is provided and includes a battery module housed in a housing space defined by a housing body and a lid, and a waterproof member is interposed between the housing body and the lid. The waterproof member has an annular shape formed by connecting a one end side and an another end side of a linear shape to each other. A first recessed portion and a first projecting portion are provided so as to be adjacent to each other on the one end side. A second recessed portion and a second projecting portion are provided so as to be adjacent to each other on the another end side. The first recessed portion and the second projecting portion mesh with each other. The second recessed portion and the first projecting portion mesh with each other.

13 Claims, 8 Drawing Sheets

24Th−22bTh>0

BATTERY PACK

CROSS REFERENCE TO RELATED APPLICATIONS

The present application claims priority to Japanese patent application no. 2023-104083, filed on Jun. 26, 2023, the entire contents of which are incorporated herein by reference.

BACKGROUND

The present disclosure relates to a battery pack.

Japanese Patent Application Laid-Open No. 2004-144384 discloses a packing including one packing material in which a V-shaped notch portion is formed at a position corresponding to each corner portion and an end portion cut at 45 degrees is formed, notch surfaces of the notch portion are bent at a root portion of the notch portion to butt against each other, and end surfaces of both end portions are caused to butt against each other to constitute a frame shape, and bonded and fixed to a flange surface of a housing.

In Japanese Patent Application Laid-Open No. 2004-144384, since end surfaces of both end portions of one packing material are configured to butt against each other, joining of the end surfaces is insufficient. For this reason, when external force is applied to the packing, there has been a possibility that misalignment occurs between the end surfaces.

SUMMARY

The present disclosure relates to providing, in an embodiment, a battery pack including a waterproof member that is less likely to cause misalignment when one end side and another end side are connected.

A battery pack according to the present disclosure, in an embodiment, is a battery pack in which a battery module is housed in a housing space defined by a housing body and a lid, and a waterproof member is interposed between the housing body and the lid.

The waterproof member has an annular shape formed by connecting a one end side and an another end side of a linear shape to each other,

- a first recessed portion and a first projecting portion are provided so as to be adjacent to each other on the one end side,
- a second recessed portion and a second projecting portion are provided so as to be adjacent to each other on the another end side, and
- the first recessed portion and the second projecting portion mesh with each other, and the second recessed portion and the first projecting portion mesh with each other.

According to the battery pack of the present disclosure, in an embodiment, when the one end side and the another end side of the waterproof member are connected, misalignment can be made difficult to occur.

DETAILED DESCRIPTION

Figure 1:
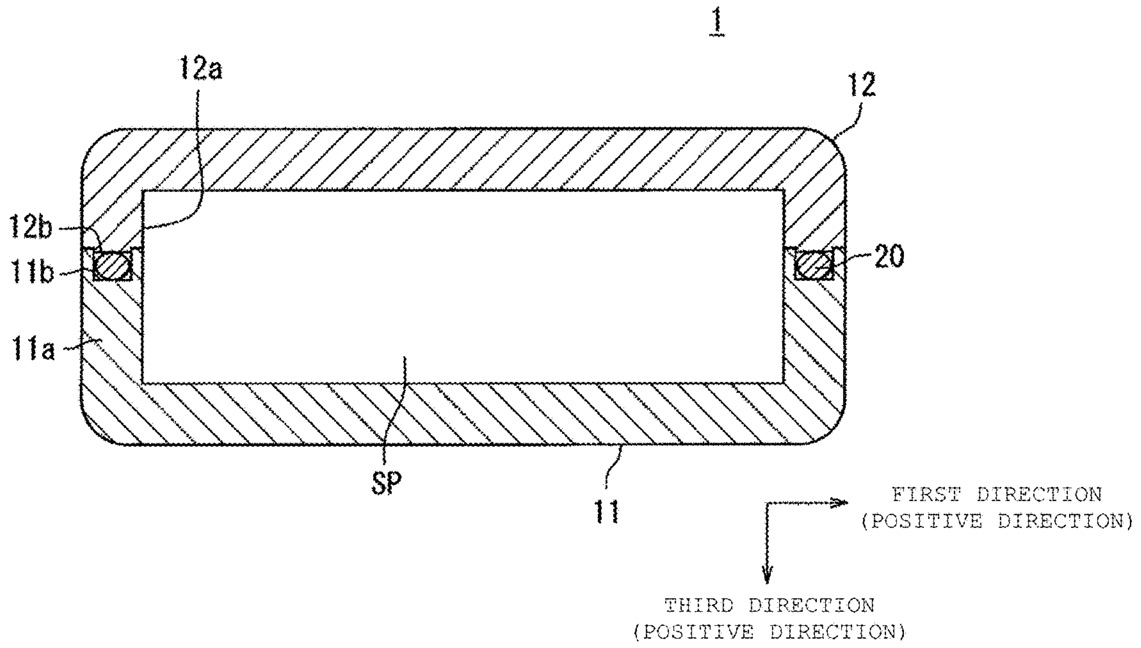
FIG. 1 is a sectional view schematically illustrating a battery pack of the present disclosure.

Hereinafter, a battery pack according to an embodiment of the present disclosure will be described in more detail. Although description will be made with reference to the drawings as necessary, various elements in the drawings are merely schematically and exemplarily shown for understanding of the present disclosure, and appearance and a dimensional ratio and the like can be different from those of actual ones.

Various numerical ranges referred to herein are intended to include lower limit and upper limit numerical values themselves, unless otherwise noted, such as "less than" or "greater than/larger than". That is, when a numerical range such as 1 to 10 is taken as an example, it can be interpreted as including "1" as a lower limit and also including "10" as an upper limit. Further, terms such as "about" and "degree" mean that they may include variation of a few percent, for example, ±10%.

The term "planar view" in the present description refers to a state when an object (for example, a battery pack) is placed and viewed from directly above its thickness (height) direction, and has the same meaning as plan view. As an example, the planar view is a state when viewed along a positive direction in a "third direction" illustrated in FIG. 1. The term "view from the side" in the present description refers to a state when an object (for example, a battery pack) is placed and viewed from the side perpendicular to its thickness (height) direction unless otherwise specified, and has the same meaning as the side view. As an example, a view from the side is a state when viewed along a positive direction (or a negative direction) in a "first direction" illustrated in FIG. 1. The term "view from the front" in the present description refers to a state when an object (for example, a battery pack) is placed and viewed from the front perpendicular to its thickness (height) direction unless otherwise specified, and has the same meaning as the front view. As an example, a view from the front is a state when viewed along a positive direction in a "second direction" illustrated in FIG. 2. Note that the above-described "positive direction" is intended to be a direction of an arrow in the first direction, the second direction, and the third direction illustrated in the drawings, and the "negative direction" is intended to be a direction opposite to a direction of an arrow in the first direction, the second direction, and the third direction illustrated in the drawings. Further, the first direction, the second direction, and the third direction are orthogonal to each other.

Figure 2:
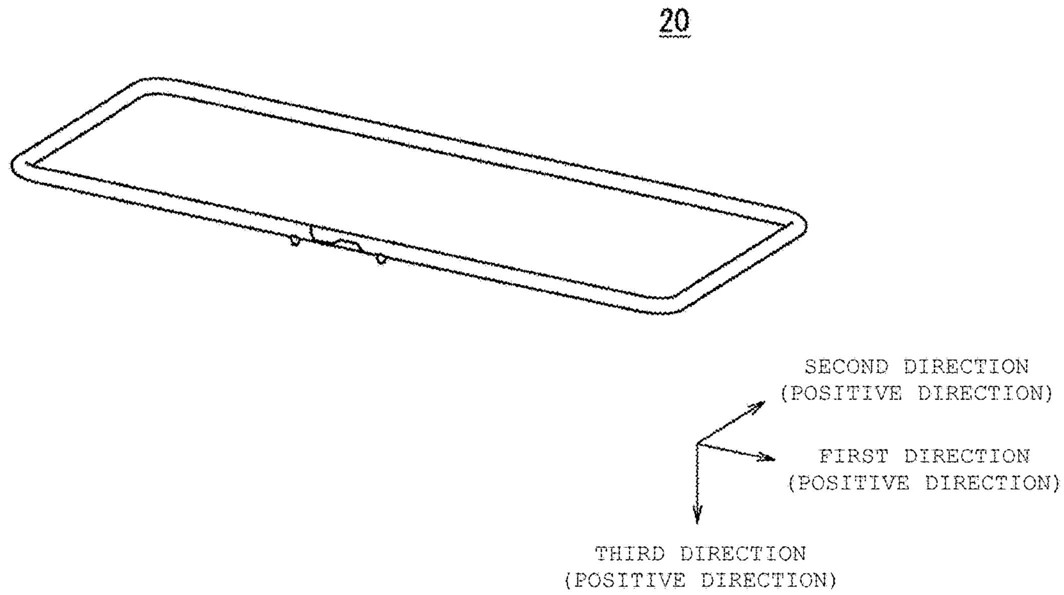
FIG. 2 is a perspective view schematically illustrating a waterproof member used in the battery pack of the present disclosure.
Figure 3:
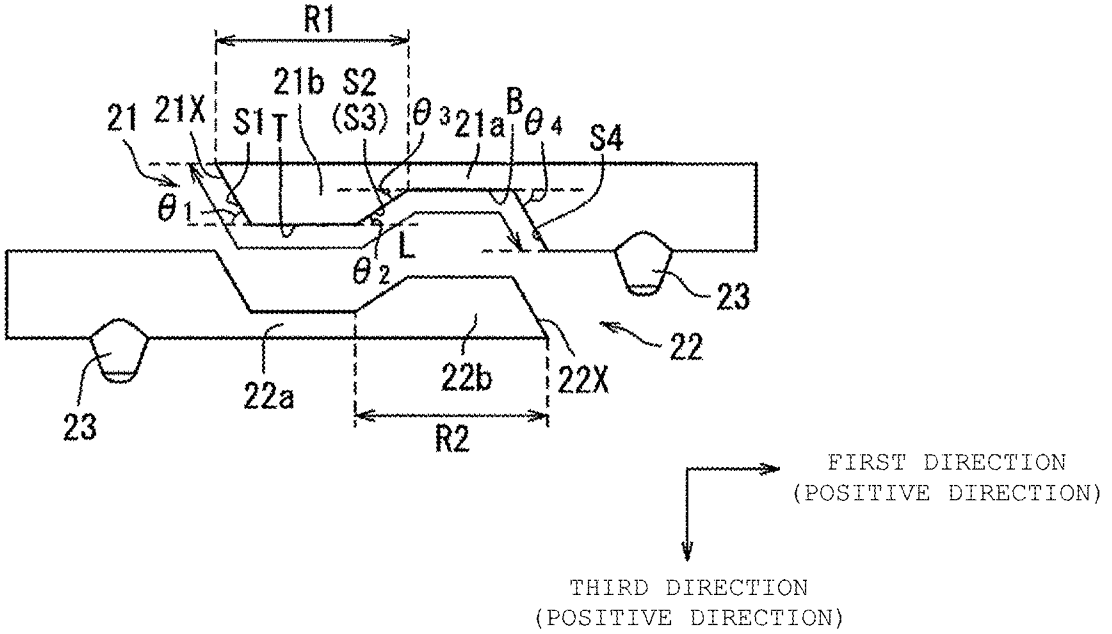
FIG. 3 is a front view schematically illustrating a main part of the waterproof member of an embodiment.

Hereinafter, a first embodiment of the battery pack of the present disclosure will be described with reference to FIGS. 1 to 3. FIG. 1 is a sectional view schematically illustrating the battery pack of the present disclosure, FIG. 2 is a perspective view schematically illustrating a waterproof member used in the battery pack of the present disclosure, and FIG. 3 is a front view schematically illustrating a main part of the waterproof member of the first embodiment.

A battery of the first embodiment includes a housing body 11 that houses a battery module (not illustrated) and a lid 12, and a waterproof member 20 interposed between the housing body 11 and the lid 12. Hereinafter, each configuration will be described in detail.

The housing body 11 has a housing space SP that houses a battery module. The housing body 11 illustrated in FIG. 1 may have a rectangular shape in plan view. Note that a shape of the housing body 11 is not limited to a rectangular shape in plan view, and may be a circular shape or an elliptical shape in plan view, a polygonal shape in plan view, or the like as long as the housing space SP for housing a battery module is provided.

A material of the housing body 11 may be any material, and may be a resin material (for example, plastic) or a metal material. Examples of the resin material include polycarbonate resin (PC), acrylonitrile-butadiene-styrene resin (ABS), polybutylene terephthalate resin (PBT), modified polyphenylene ether resin (m-PPE), and polyamide resin (PA). Examples of the metal material include aluminum. Note that, from the viewpoint of housing a battery module, it is preferable to use a material having high rigidity for the housing body 11.

A defining portion 11*a* for defining the housing space SP is arranged around the housing space SP. The lid 12 can be installed on the defining portion 11*a*. In the defining portion 11*a*, a groove 11*b* for housing a waterproof member 20 is provided on an installation surface on which the lid 12 is installed. By installing the lid 12 on the housing body 11 after the waterproof member 20 is housed in the groove 11*b*, it is possible to prevent moisture from entering the housing space SP.

The groove 11*b* may be provided with a hole (not illustrated) for fitting a position fixing projecting portion 23 of the waterproof member 20. By fitting the position fixing projecting portion 23 of the waterproof member 20 into the hole, the waterproof member 20 may be positioned at the groove 11*b* of the housing body 11.

The lid 12 is a member for sealing the housing space SP. From another viewpoint, the lid 12 defines a height direction of the housing space SP. A shape of the lid 12 may be any shape as long as the lid 12 can seal the housing space SP. Further, a material of the lid 12 may be the same as or different from a material of the housing body 11.

The lid 12 may include an abutting portion 12*a* that abuts on the defining portion 11*a* of the housing body 11. The abutting portion 12*a* may be provided with a pressing protruding portion 12*b* that presses the waterproof member 20 when the lid 12 is installed on the housing body 11. When the waterproof member 20 is pressed by the pressing protruding portion 12*b*, the waterproof member 20 is deformed, the waterproof member 20 comes into close contact with the groove 11*b*, and entry of moisture into the housing space SP can be prevented.

Note that, in the above description, an aspect in which the groove 11*b* is provided on the housing body 11 side and the pressing protruding portion 12*b* is provided on the lid 12 side is described. However, the present disclosure is not limited to this aspect, and the groove 11*b* may be provided on the lid 12 side and the pressing protruding portion 12*b* may be provided on the housing body 11 side.

The waterproof member 20 is a member interposed between the housing body 11 and the lid 12. As described above, the waterproof member 20 may be made from a flexible material from the viewpoint of further preventing moisture from entering the housing space SP by being in close contact with the groove by being deformed. Examples of the plastic material include silicon rubber, ethylene-propylene-diene rubber, nitrile rubber, and the like. Alternatively, a material containing the rubber material and having plasticity can be used.

The waterproof member 20 has an annular shape formed by connecting a one end 21 side and another end 22 side of a linear shape to each other (see FIGS. 2, 3, and the like). As illustrated in FIG. 3 schematically showing a main part of the waterproof member 20, a first recessed portion 21*a* and a first projecting portion 21*b* are provided adjacent to each other on the one end 21 side. Further, on the another end 22 side, a second recessed portion 22*a* and a second projecting portion 22*b* are provided so as to be adjacent to each other (see FIG. 3). Then, the first recessed portion 21*a* on the one end 21 side and the second projecting portion 22*b* on the another end 22 side mesh with each other, and the second recessed portion 22*a* on the another end 22 side and the first projecting portion 21*b* on the one end 21 side mesh with each other.

To "mesh with each other" referred to in the present description is clearly different from an aspect in which notched surfaces of the packing material are simply in contact with each other to butt against each other. That is, in the waterproof member 20 of the present disclosure, the second projecting portion 22*b* on the another end 22 side enters the first recessed portion 21*a* on the one end 21 side, and the first projecting portion 21*b* on the one end 21 side enters the second recessed portion 22*a* on the another end 22 side, so that the one end 21 side and the another end 22 side are more firmly connected.

As described above, according to a battery pack 1 of the present embodiment, in the waterproof member 20 having an annular shape formed by connecting the one end 21 side and the another end 22 side to each other, the first recessed portion 21*a* on the one end 21 side and the second projecting portion 22*b* on the another end 22 side mesh with each other, and the second recessed portion 22*a* on the another end 22 side and the first projecting portion 21*b* on the one end 21 side mesh with each other. Therefore, it is possible to make it difficult to cause misalignment in connection between the one end 21 side and the another end 22 side.

A specific aspect of connecting the one end 21 side and the another end 22 side of the waterproof member 20 will be described in detail below.

As a preferable aspect of the waterproof member 20, as illustrated in FIG. 3, the first projecting portion 21*b* may be provided in a region R1 on a tip side on the one end 21 side, and the second projecting portion 22*b* may be provided in a region R2 on the tip side on the another end 22 side. That is, end portions on the one end side and the another end side form a projecting shape and do not form a recessed shape. That "a projecting portion is provided in an end portion" in the present description means that end surfaces 21_x_ and 22_x_ of the one end 21 or the another end 22 constitute outer surfaces of the projecting portions 21_b_ and 22_b_.

According to such a configuration, since the first projecting portion 21_b_ is provided in the region R1 on the tip side on the one end 21 side and the second projecting portion 22_b_ is provided in the region R2 on the tip side on the another end 22 side, it is possible to make it more difficult to disengage meshing in an extending direction (first direction) of the waterproof member 20.

As a more specific aspect of the waterproof member 20, the first projecting portion 21_b_ may have a top surface T, a first side surface S1 on the end portion side, and a second side surface S2 facing the first side surface S1, and the first side surface S1 and the second side surface S2 may be inclined with respect to the top surface T (see FIG. 3). Further, the first recessed portion 21_a_ may have a bottom surface B, a third side surface S3 on the end portion side, and a fourth side surface S4 facing the third side surface S3, and the third side surface S3 and the fourth side surface S4 may be inclined with respect to the bottom surface B (see FIG. 3). In the aspect illustrated in FIG. 3 as an example, since the first projecting portion 21_b_ and the first recessed portion 21_a_ are adjacent to each other in the vicinity, the second side surface S2 of the first projecting portion 21_b_ and the third side surface S3 of the first recessed portion 21_a_ share the same surface. However, in a case where the first projecting portion 21_b_ and the first recessed portion 21_a_ are adjacent to each other at a distance, the second side surface S2 of the first projecting portion 21_b_ and the third side surface S3 of the first recessed portion 21_a_ may be different surfaces.

Here, to "face" in the present description means that surfaces are at a position of facing each other, but includes not only a case where the surfaces face each other fully, but also a case where the surfaces face each other in an inclined state, and a case where the surfaces face each other fully or in an inclined state while a member is interposed between the surfaces.

Then, the first projecting portion 21_b_ and the first recessed portion 21_a_, and the second projecting portion 22_b_ and the second recessed portion 22_a_ may have shapes complementary to each other in a sectional view of the waterproof member 20. The "shapes complementary to each other" as used in the present description is intended as shapes of contact surfaces complementary to each other, such as a recessed shape on the one hand and a projecting shape that fits into the recessed shape on the other hand. From another viewpoint, it is intended that the first projecting portion 21_b_ and the first recessed portion 21_a_, and the second projecting portion 22_b_ and the second recessed portion 22_a_ may be in a point-symmetric relationship with each other when an intersection obtained by drawing two straight lines connecting corresponding two points is set as the center of symmetry.

As described above, when the first side surface S1, the second side surface S2, the third side surface S3, and the fourth side surface S4 are inclined with respect to the top surface T and/or the bottom surface B, and the first projecting portion 21_b_ and the first recessed portion 21_a_, and the second projecting portion 22_b_ and the second recessed portion 22_a_ have shapes complementary to each other in a sectional view of the waterproof member 20, when the first projecting portion 21_b_ and the first recessed portion 21_a_, and the second projecting portion 22_b_ and the second recessed portion 22_a_ mesh with each other, a contact area between the side surfaces is widened, and the side surfaces can be pressed against each other. Therefore, adhesion can be improved as compared with a case where the first side surface S1, the second side surface S2, the third side surface S3, and the fourth side surface S4 are perpendicular to the top surface T or the bottom surface B. Further, due to increase in a contact area, a creepage distance L (see FIG. 3) from the first side surface S1 to the fourth side surface S4 becomes as long as possible. This makes it difficult for moisture to propagate along the creepage distance L, so that waterproof property of the battery pack 1 can be improved.

To describe in detail an inclination of the first side surface S1 and the second side surface S2, an inclination of the first side surface S1 with respect to the top surface T (inclination angle θ1 in FIG. 3) and an inclination of the second side surface S2 with respect to the top surface T (inclination angle $\theta_2$ in FIG. 3) may be different from each other. The larger an inclination of a side surface (as an example, an inclination angle of 450 or more), the firmer the engagement can be made, and the smaller an inclination of a side surface (as an example, an inclination angle of less than 45°), the larger the contact area and the longer the creepage distance L, so that waterproof property can be improved. For this reason, by making an inclination of the first side surface S1 and an inclination of the second side surface S2 different, it is possible to achieve both firm meshing and improvement in waterproof property.

To describe an inclination of the first side surface S1 to the fourth side surface S4 in more detail, an inclination of the first side surface S1 with respect to the top surface T (inclination angle $\theta_1$ in FIG. 3) may be larger than an inclination of the second side surface S2 with respect to the top surface T (inclination angle $\theta_2$ in FIG. 3), an inclination of the fourth side surface S4 with respect to the bottom surface B (inclination angle $\theta_4$ in FIG. 3) may be larger than an inclination of the third side surface S3 with respect to the bottom surface B (inclination angle $\theta_3$ in FIG. 3), and the second side surface S2 and the third side surface S3 may share the same structure. Note that the inclination of a side surface in the above description is an angle with a side surface with respect to an extension line of the top surface T (or the bottom surface B), and is intended to be an angle of 90° or less. According to such a configuration, an inclination of outer side surfaces (the first side surface S1 and the fourth side surface S4) caused by meshing is made large and an inclination of side surfaces (the second side surface S2 and the third side surface S3) located on the inner side of these side surfaces is made small, so as to make it possible to improve waterproof property by the inner side surface while realizing firm meshing on the outer side surface.

Next, as a further specific aspect of connecting the one end 21 side and the another end 22 side of the waterproof member 20, meshing between the first recessed portion 21_a_ and the second projecting portion 22_b_ and between the second projecting portion 22_b_ and the first recessed portion 21_a_ will be described in detail below.

In the waterproof member 20, when an extending direction of the linear waterproof member 20 before connection is defined as a first direction, a direction orthogonal to the first direction is defined as a second direction, and a direction orthogonal to both the first direction and the second direction is defined as a third direction, a meshing direction of the first recessed portion 21_a_ and the second projecting portion 22_b_ and a meshing direction of the second recessed portion 22_a_ and the first projecting portion 21_b_ are the third direction. That is, since the first direction, which is an extending direction of the waterproof member 20, and the third direction, which is a meshing direction of the waterproof member 20, are orthogonal to each other, meshing of the waterproof member 20 can be made firmer with less influence of extension in the first direction of the waterproof member 20.

As a specific aspect regarding the second direction, the first projecting portion and the first recessed portion and the second projecting portion and the second recessed portion may be provided over the entire second direction. That "the projecting portion and the recessed portion are provided over the entire second direction" in the present description is intended to be a state in which the top surface T of the projecting portion and the bottom surface B of the recessed portion are in a state of being continuous along the second direction (a state in which the top surface T and the bottom surface B extend along the second direction). According to such a configuration, the first projecting portion 21*b* and the second recessed portion 22*a* and the second projecting portion 22*b* and the first recessed portion 21*a* can mesh with each other in the entire second direction, and firmer meshing and higher waterproof property can be realized.

As a specific aspect regarding the third direction, the third direction may be a pressing direction of the lid 12 and the housing body 11. According to such a configuration, since a direction in which the one end 21 side and the another end 22 side of the waterproof member 20 mesh with each other coincides with the pressing direction of the lid 12 and the housing body 11, meshing of the waterproof member 20 can be made firmer.

In an embodiment, the waterproof member 20 may be solid. The term "solid" as used in the present description is intended to be a structure in which there is no hole or space inside (the inside is filled). By making the waterproof member 20 solid, strength of the waterproof member can be improved as compared with a hollow waterproof member.

As a further preferable aspect of the waterproof member 20, the waterproof member 20 may have a pair of the position fixing projecting portions 23 arranged so as to sandwich a meshing structure that connects the one end 21 side and the another end 22 side. More specifically, when the one end 21 side and the another end 22 side of the waterproof member 20 are connected to form an annular shape, the pair of the position fixing projecting portions 23 may be provided so as to sandwich the first recessed portion 21*a* and the second projecting portion 22*b*, and the second projecting portion 22*b* and the first recessed portion 21*a* in the first direction. Then, the pair of the position fixing projecting portions 23 may be fitted into a hole of the housing body 11. When the position fixing projecting portion 23 is identified from another viewpoint, the pair of the position fixing projecting portions 23 may protrude in a pressing direction of the lid 12 and the housing body 11 which is the third direction (see FIG. 3). According to such a configuration, it is possible to attach the waterproof member 20 to the housing body 11 while maintaining a meshing state of the waterproof member 20 by the pair of the position fixing projecting portions 23 arranged so as to sandwich the meshing structure.

Figure 4A:
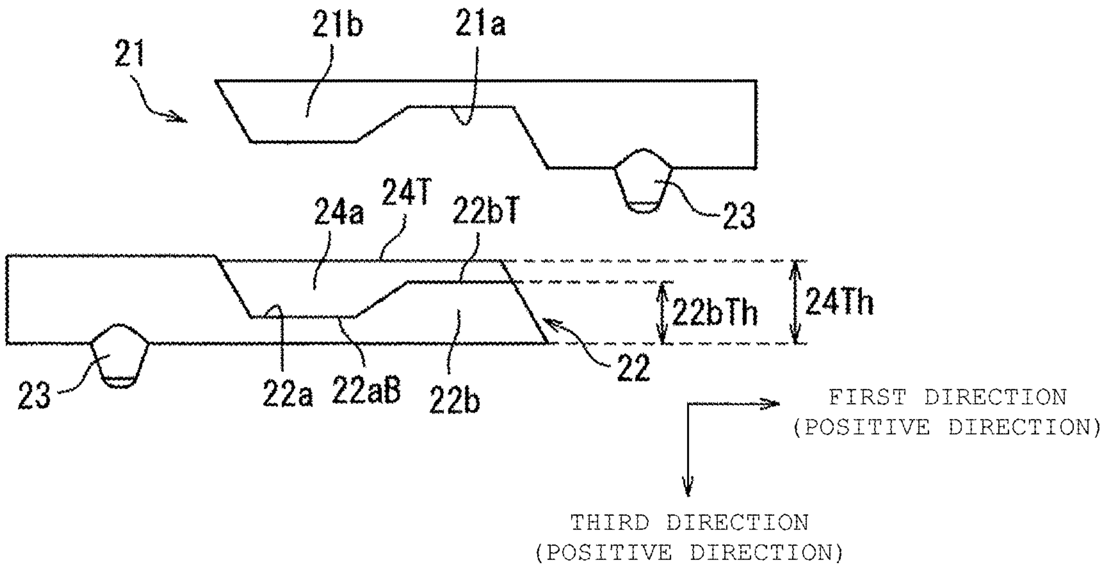
FIG. 4A is a front view schematically illustrating a main part of the waterproof member according to an embodiment.
Figure 4B:
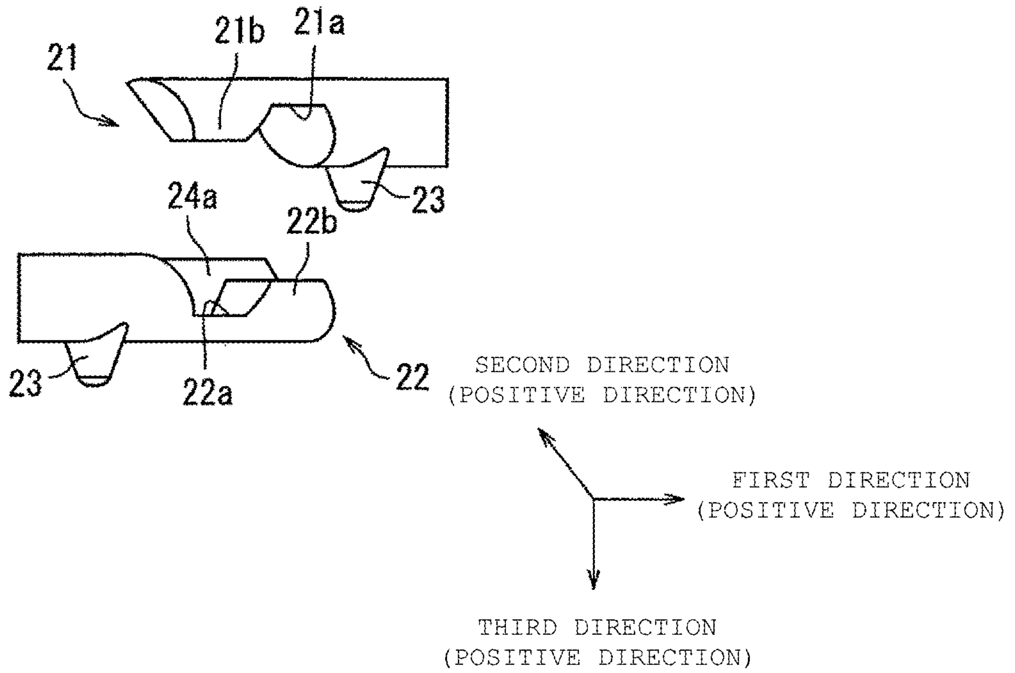
FIG. 4B is a perspective view schematically illustrating the main part of the waterproof member according to an embodiment.
Figure 4C:
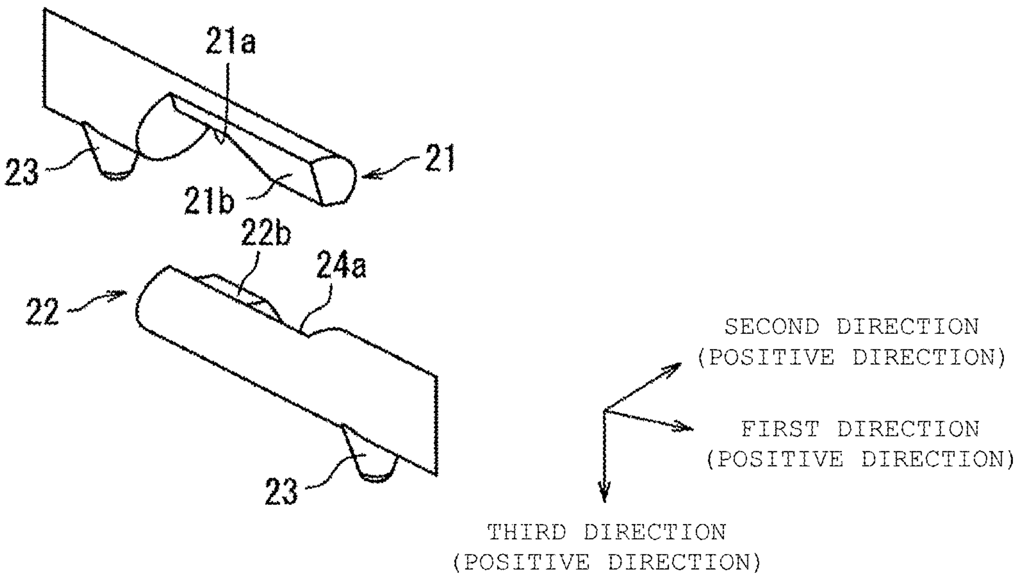
FIG. 4C is a perspective view schematically illustrating the main part of the waterproof member according to an embodiment.
Figure 4D:
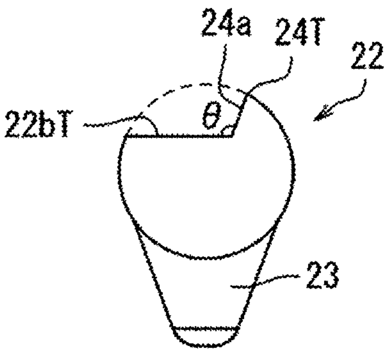
FIG. 4D is a side view of another end side of the waterproof member of the second embodiment as viewed from the side.

Next, a second embodiment of the battery pack of the present disclosure will be described with reference to FIGS. 4A to 4D. FIGS. 4A to 4C are a front view or a perspective view schematically illustrating a main part of the waterproof member of the second embodiment, and FIG. 4D is a side view of another end side of the waterproof member of the second embodiment. Note that, in description of the battery pack of the second embodiment, the description of a point common to a configuration of the battery pack of the first embodiment will be appropriately omitted. That is, a configuration different from that of the battery pack of the first embodiment will be mainly described below.

In the battery pack 1 of the second embodiment, the waterproof member 20 may have a raised portion 24*a* adjacent to the second projecting portion 22*b* and the second recessed portion 22*a* on the another end 22 side in the second direction. The raised portion used in the present description is intended to protrude higher than a top surface of an adjacent projecting portion and/or a bottom surface of an adjacent recessed portion. According to FIGS. 4A to 4C, the raised portion 24*a* is adjacent to the second projecting portion 22*b* and the second recessed portion 22*a* on the another end 22 side in the second direction. On the other hand, no raised portion is provided on the one end 21 side.

As in the battery pack 1 of the second embodiment, since the raised portion 24*a* is adjacent to the second projecting portion 22*b* and the second recessed portion 22*a* in the second direction, it is possible to further reduce misalignment in the second direction of a connection portion between the one end 21 side and the another end 22 side of the waterproof member 20 due to external force received by the battery pack 1. Further, it is possible to further reduce moisture entering in the second direction by the raised portion 24*a*.

As a preferable aspect of the raised portion, the raised portion 24*a* may be inclined with respect to the second direction. Note that, as an inclination of the raised portion 24 with respect to the second direction is smaller (as an example, an inclination angle θ, which is an angle between a top surface 22*b*T of the second projecting portion 22*b* and the raised portion 24*a*, is less than 135°), misalignment of a connection portion between the one end 21 side and the another end 22 side of the waterproof member 20 when receiving external force can be reduced more (see FIG. 4D). Further, as an inclination of the raised portion 24*a* with respect to the second direction is larger (as an example, the inclination angle θ is 135° or more), a contact area between the first recessed portion 21*a* and the first projecting portion 21*b* and the raised portion 24*a* is larger, and moisture transmission distance is longer, so that waterproof property of the battery pack 1 can be improved. Note that the inclination angle θ may be an angle between a bottom surface 22*a*B of the second recessed portion 22*a* and the raised portion 24*a*.

Further, as illustrated in FIG. 4A, a height 24Th in the third direction of the raised portion 24*a* may be larger than a height 22*b*Th in the third direction of the second projecting portion 22*b*. By making the height 24Th in the third direction of the raised portion 24*a* higher than the height 22*b*Th in the third direction of the second projecting portion, it is possible to further reduce misalignment in the second direction of a connection portion between the one end 21 side and the another end 22 side of the waterproof member 20 due to external force received by the battery pack 1, and it is possible to appropriately reduce entry of moisture in the second direction.

Figure 5A:
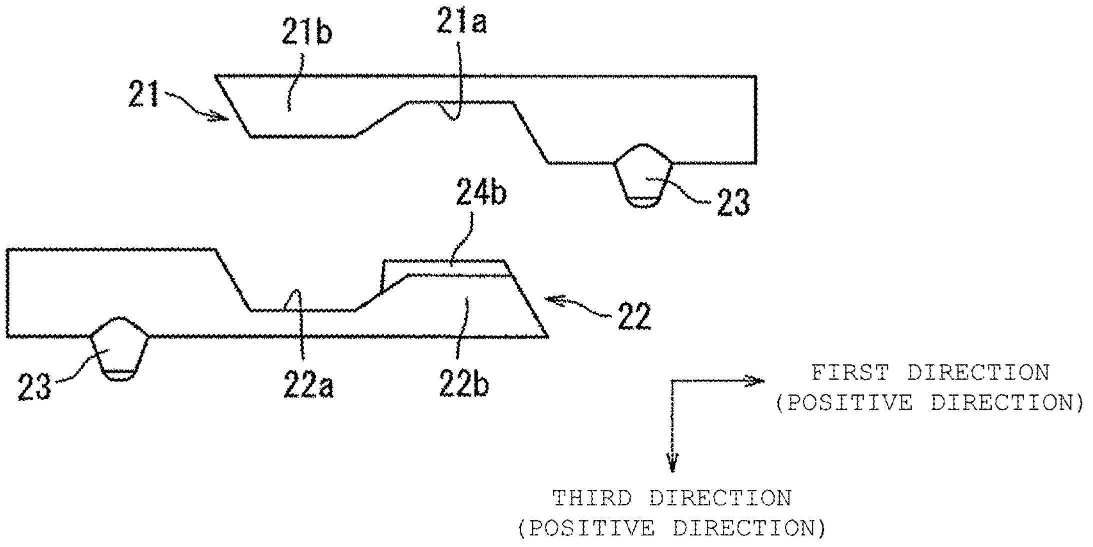
FIG. 5A is a front view schematically illustrating a main part of the waterproof member according to a third embodiment.
Figure 5B:
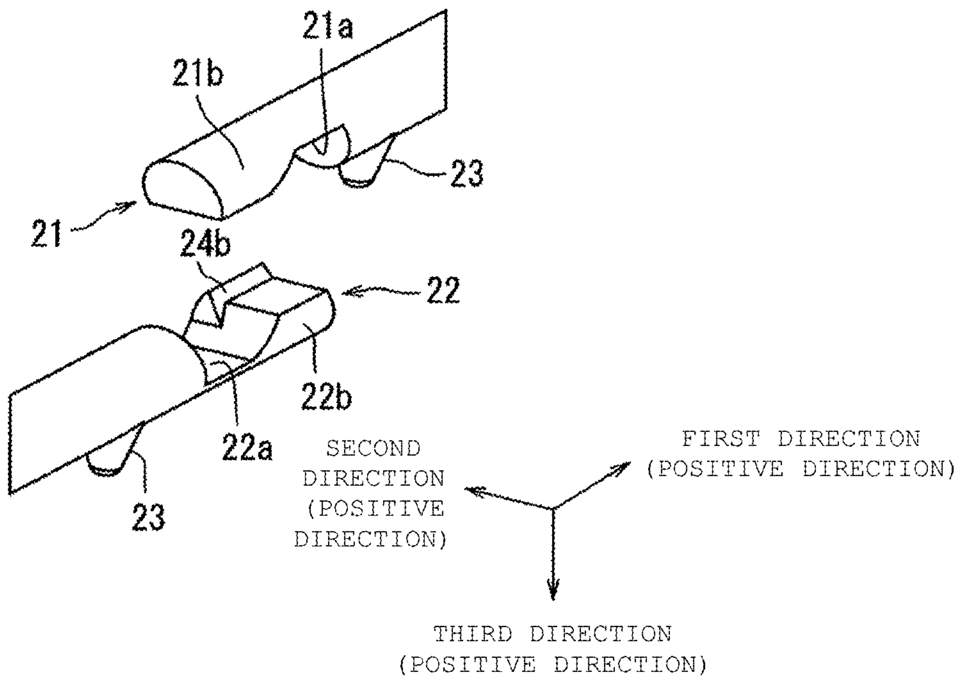
FIG. 5B is a perspective view schematically illustrating the main part of the waterproof member according to an embodiment.
Figure 5C:
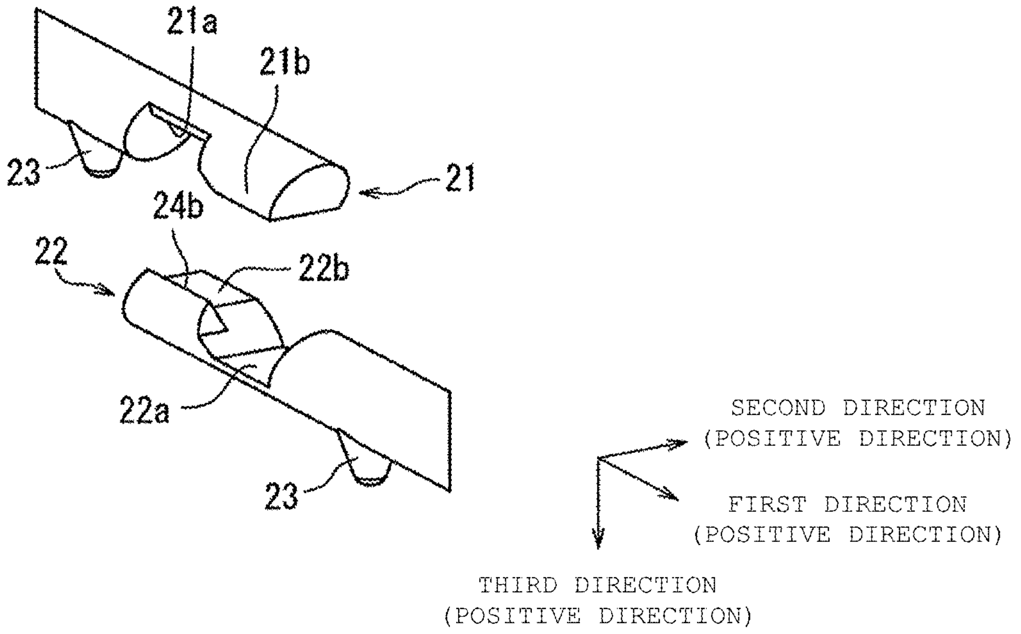
FIG. 5C is a perspective view schematically illustrating the main part of the waterproof member according to an embodiment.

Next, a third embodiment of the battery pack of the present disclosure will be described with reference to FIGS. 5A to 5C. FIGS. 5A to 5C are a front view or a perspective view schematically illustrating a main part of the waterproof member according to the third embodiment. Note that, in description of the battery pack of the third embodiment, the description of a point common to a configuration of the battery pack of the first to second embodiments will be appropriately omitted. That is, a configuration different from that of the battery pack of the first to second embodiments will be mainly described below.

In the battery pack 1 of the third embodiment, the waterproof member 20 may have a raised portion 24*b* adjacent to the second projecting portion on the another end 22 side in the second direction. According to FIGS. 5A to 5C, the raised portion 24*b* is adjacent to the second projecting portion 22*b* on the another end 22 side in the second direction. On the other hand, the raised portion 24*b* is not provided in the second direction of the second recessed portion 22*a* on the another end 22 side. Further, the raised portion 24*b* is not provided on the one end 21 side.

With such a configuration, as compared with the waterproof member 20 of the first embodiment, misalignment in the second direction of a connection portion between the one end 21 side and the another end 22 side of the waterproof member 20 can be further reduced.

Figure 6:
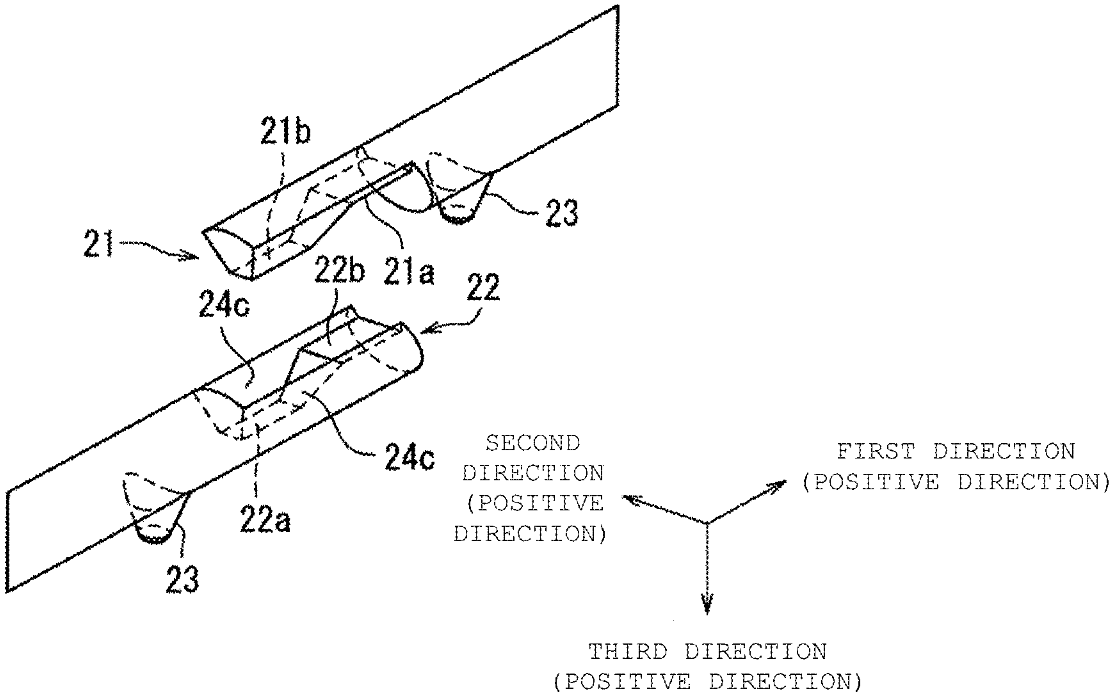
FIG. 6 is a perspective view schematically illustrating a main part of the waterproof member according to an embodiment.

Next, a fourth embodiment of the battery pack of the present disclosure will be described with reference to FIG. 6. FIG. 6 is a perspective view schematically illustrating a main part of the waterproof member according to the fourth embodiment; Note that, in description of the battery pack of the fourth embodiment, the description of a point common to a configuration of the battery pack of the first to third embodiments will be appropriately omitted. That is, a configuration different from that of the battery pack of the first to third embodiments will be mainly described below.

In the battery pack 1 of the fourth embodiment, a raised portion 24*c* may be provided on both sides in the second direction of the second projecting portion 22*b* and the second recessed portion 22*a*. In the example illustrated in FIG. 6, the raised portion 24*c* may be provided on both sides in the second direction of the second projecting portion 22*b* and the second recessed portion 22*a* on the another end 22 side. Further, no raised portion is provided on the one end 21 side.

Note that the battery pack 1 of the fourth embodiment is not limited to the aspect of FIG. 6, and may be, for example, an aspect in which the raised portion 24*c* is provided only on both sides in the second direction of the second projecting portion 22*b* (that is, an aspect in which no raised portion is provided in the second direction of the second recessed portion), or an aspect in which the raised portion 24*c* is provided only on both sides in the second direction of the second recessed portion 22*a* (that is, an aspect in which no raised portion is provided in the second direction of the second projecting portion). Further, the raised portion 24*c* may be provided on both sides in the second direction of the one end 21 side and the another end 22 side by making a height dimension in the third direction of the raised portion 24*c* smaller than a height dimension in the third direction of the first projecting portion 21*b* and/or the second projecting portion 22*b*.

According to the battery pack 1 of the fourth embodiment, since the raised portion 24*c* is provided on both sides in the second direction of the second projecting portion and/or the second recessed portion, when the one end side and the another end side of the waterproof member mesh with each other, the meshing can be performed with high positional accuracy by the raised portion on both sides in the second direction.

Figure 7:
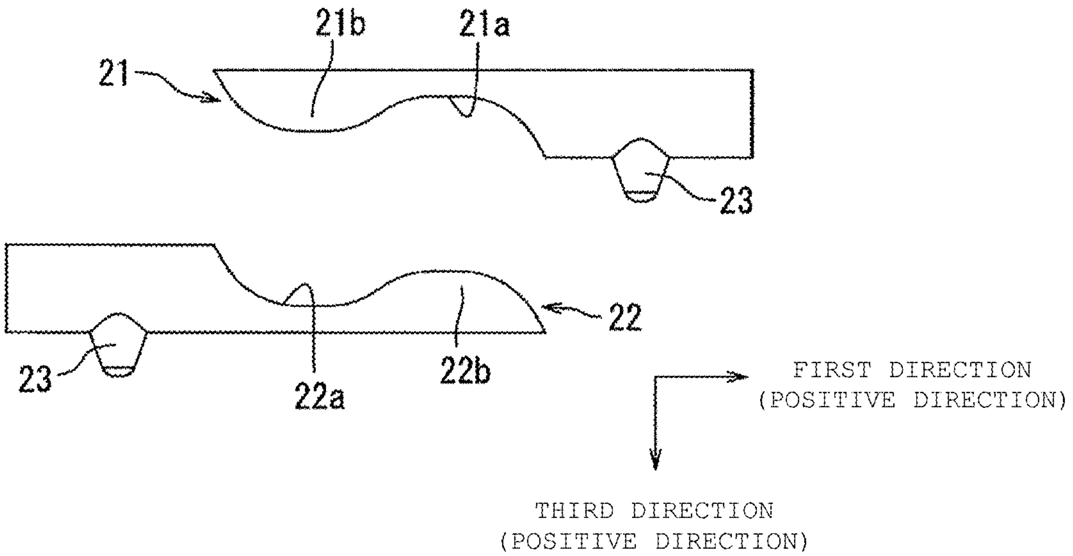
FIG. 7 is a front view schematically illustrating a main part of the waterproof member according to an embodiment.
Figure 8:
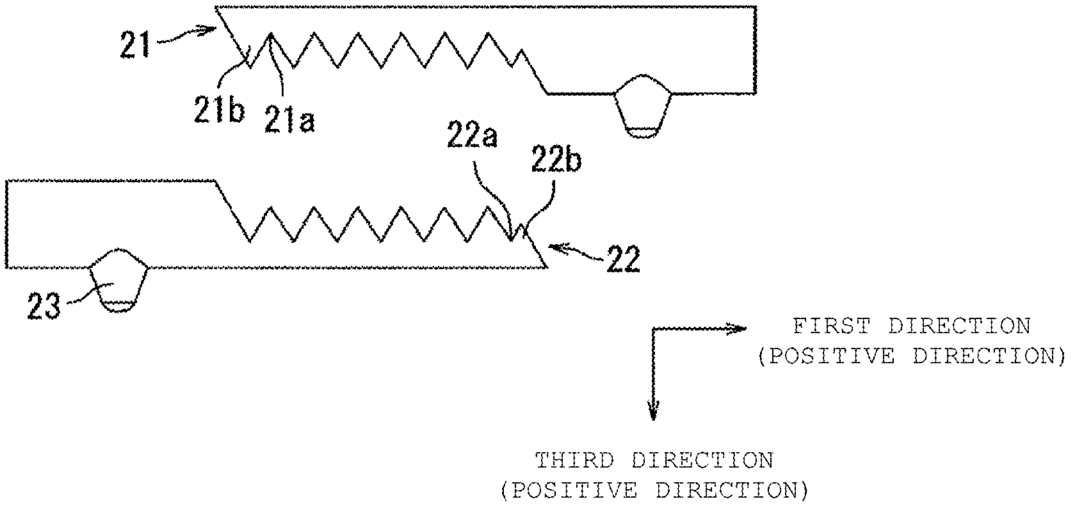
FIG. 8 is a front view schematically illustrating a main part of the waterproof member according to an embodiment.

Next, a fifth embodiment and a sixth embodiment of the battery pack of the present disclosure will be described with reference to FIGS. 7 and 8. FIG. 7 is a front view schematically illustrating a main part of the waterproof member according to the fifth embodiment, and FIG. 8 is a front view schematically illustrating a main part of the waterproof member according to the sixth embodiment. Note that, in description of the battery pack of the fifth and sixth embodiments, description common to the configuration of the battery packs of the first to fourth embodiments is appropriately omitted. That is, a configuration different from that of the battery pack of the first to fourth embodiments will be mainly described below.

In the battery pack 1 of the fifth embodiment, as illustrated in FIG. 7, each of the first recessed portion 21*a* and the second recessed portion 22*a* has a curved recessed surface, and each of the first projecting portion 21*b* and the second projecting portion 22*b* has a curved projecting surface. Regarding the curved recessed surface and the curved projecting surface as in the fifth embodiment, the first recessed portion 21*a* on the one end 21 side and the second projecting portion 22*b* on the another end 22 side can mesh with each other, the second recessed portion 22*a* on the another end 22 side and the first projecting portion 21*b* on the one end 21 side can mesh with each other, and misalignment in connection between the one end 21 side and the another end 22 side can be made difficult to occur.

Further, in the battery pack 1 of the sixth embodiment, as illustrated in FIG. 8, each of the first recessed portion 21*a* and the second recessed portion 22*a* has a triangular recessed surface, a plurality of the triangular recessed surfaces are arranged in the first direction, each of the first projecting portion 21*b* and the second projecting portion 22*b* has a triangular projecting surface, and a plurality of the triangular projecting surfaces are arranged in the first direction. With the triangular recessed surface and the triangular projecting surface as in the sixth embodiment, the first recessed portion 21*a* on the one end 21 side and the second projecting portion 22*b* on the another end 22 side can mesh with each other, the second recessed portion 22*a* on the another end 22 side and the first projecting portion 21*b* on the one end 21 side can mesh with each other, and misalignment in connection between the one end 21 side and the another end 22 side can be made difficult to occur. Note that, instead of the triangular projecting surface and the triangular recessed surface illustrated in FIG. 8, a polygonal projecting surface and a polygonal recessed surface may be used.

The battery pack of the present disclosure includes an aspect below.

<1> A battery pack in which a battery module is housed in a housing space defined by a housing body and a lid, and a waterproof member is interposed between the housing body and the lid.

The waterproof member has an annular shape formed by connecting a one end side and an another end side of a linear shape to each other,

- a first recessed portion and a first projecting portion are provided so as to be adjacent to each other on the one end side,
- a second recessed portion and a second projecting portion are provided so as to be adjacent to each other on the another end side, and
- the first recessed portion and the second projecting portion mesh with each other, and the second recessed portion and the first projecting portion mesh with each other.

<2> The battery pack according to <1>, in which

- the first projecting portion is provided in a region on a tip side on the one end side, and
- the second projecting portion is provided in a region on a tip side on the another end side.

<3> The battery pack according to <1> or <2>, in which the waterproof member is solid.

<4> The battery pack according to any one of <1> to <3>, in which in the waterproof member, the first projecting portion has a top surface, a first side surface on an end portion side, and a second side surface facing the first side surface, and the first side surface and the second side surface are inclined with respect to the top surface, the first recessed portion has a bottom surface, a third side surface on an end portion side, and a fourth side surface facing the third side surface, and the third side surface and the fourth side surface are inclined with respect to the bottom surface, and the first projecting portion and the first recessed portion, and the second projecting portion and the second recessed portion have shapes complementary to each other in a sectional view of the waterproof member.

<5> The battery pack according to <4>, in which an inclination of the first side surface with respect to the top surface and an inclination of the second side surface with respect to the top surface are different from each other.

<6> The battery pack according to <5>, in which in the waterproof member, the inclination of the first side surface with respect to the top surface is larger than the inclination of the second side surface with respect to the top surface, an inclination of the fourth side surface with respect to the bottom surface is larger than an inclination of the third side surface with respect to the bottom surface, and the second side surface and the third side surface share a same structure.

<7> The battery pack according to any one of <1> to <6>, in which in the waterproof member, an extending direction of the waterproof member having a linear shape before connection is defined as a first direction, a direction orthogonal to the first direction is defined as a second direction, and a direction orthogonal to the first direction and the second direction is defined as a third direction, and a meshing direction of the first recessed portion and the second projecting portion and a meshing direction of the second recessed portion and the first projecting portion are the third direction.

<8> The battery pack according to <7>, in which the third direction is a pressing direction of the lid and the housing body.

<9> The battery pack according to <7> or <8>, in which the first projecting portion and the first recessed portion, and the second projecting portion and the second recessed portion are provided over the entire second direction.

<10> The battery pack according to any one of <7> to <9>, in which the waterproof member has a raised portion adjacent to the second projecting portion and/or the second recessed portion on the another end side in the second direction.

<11> The battery pack according to <10>, in which the raised portion is inclined with respect to the second direction.

<12> The battery pack according to <10> or <11>, in which the raised portion is provided on both sides in the second direction of the second projecting portion and/or the second recessed portion.

<13> The battery pack according to any one of <1> to <12>, in which the waterproof member has a pair of position fixing projecting portions arranged so as to sandwich a meshing structure that connects the one end side and the another end side, and the pair of the position fixing projecting portions is fitted into a hole of the housing body.

Note that the embodiments disclosed herein are considered by way of illustration in all respects, and not considered as a basis for restrictive interpretations. Accordingly, the technical scope of the present disclosure is not to be construed only by the embodiments mentioned above, but is defined based on the description of the claims. Further, the technical scope of the present disclosure includes meanings equivalent to the claims and all modifications within the scope.

The present disclosure, in an embodiment, is relates to a battery pack including a waterproof member in which misalignment is less likely to occur when one end side and another end side are connected.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A battery pack comprising a battery module that is housed in a housing space defined by a housing body and a lid, and a waterproof member is interposed between the housing body and the lid, wherein the waterproof member has an annular shape formed by connecting a one end side and an another end side of a linear shape to each other, a first recessed portion and a first projecting portion are provided so as to be adjacent to each other on the one end side, a second recessed portion and a second projecting portion are provided so as to be adjacent to each other on the another end side, and the first recessed portion and the second projecting portion mesh with each other, and the second recessed portion and the first projecting portion mesh with each other.

2. The battery pack according to claim 1, wherein the first projecting portion is provided in a region on a tip side on the one end side, and the second projecting portion is provided in a region on a tip side on the another end side.

3. The battery pack according to claim 1, wherein the waterproof member is solid.

4. The battery pack according to claim 2, wherein in the waterproof member, the first projecting portion has a top surface, a first side surface on an end portion side, and a second side surface facing the first side surface, and the first side surface and the second side surface are inclined with respect to the top surface, the first recessed portion has a bottom surface, a third side surface on an end portion side, and a fourth side surface facing the third side surface, and the third side surface and the fourth side surface are inclined with respect to the bottom surface, and the first projecting portion and the first recessed portion, and the second projecting portion and the second recessed portion have shapes complementary to each other in a sectional view of the waterproof member.

5. The battery pack according to claim 4, wherein an inclination of the first side surface with respect to the top surface and an inclination of the second side surface with respect to the top surface are different from each other.

6. The battery pack according to claim 5, wherein in the waterproof member, the inclination of the first side surface with respect to the top surface is larger than the inclination of the second side surface with respect to the top surface, an inclination of the fourth side surface with respect to the bottom surface is larger than an inclination of the third side surface with respect to the bottom surface, and the second side surface and the third side surface share a same structure.

7. The battery pack according to claim 1, wherein in the waterproof member, an extending direction of the waterproof member having a linear shape before connection is defined as a first direction, a direction orthogonal to the first direction is defined as a second direction, and a direction orthogonal to the first direction and the second direction is defined as a third direction, and a meshing direction of the first recessed portion and the second projecting portion and a meshing direction of the second recessed portion and the first projecting portion are the third direction.

8. The battery pack according to claim 7, wherein the third direction is a pressing direction of the lid and the housing body.

9. The battery pack according to claim 7, wherein the first projecting portion and the first recessed portion, and the second projecting portion and the second recessed portion are provided over the entire second direction.

10. The battery pack according to claim 7, wherein the waterproof member has a raised portion adjacent to the second projecting portion and/or the second recessed portion on the another end side in the second direction.

11. The battery pack according to claim 10, wherein the raised portion is inclined with respect to the second direction.

12. The battery pack according to claim 10, wherein the raised portion is provided on both sides in the second direction of one or both of the second projecting portion and the second recessed portion.

13. The battery pack according to claim 1, wherein the waterproof member has a pair of position fixing projecting portions arranged so as to sandwich a meshing structure that connects the one end side and the another end side, and the pair of position fixing projecting portions is fitted into a hole of the housing body.

* * * * *